Patented Feb. 9, 1937

2,070,292

UNITED STATES PATENT OFFICE 2,070,292

CUPRIFEROUS AZO DYESTUFFS AND THEIR PRODUCTION

Mordecai Mendoza, Blackley, Manchester, England, assignor to Imperial Chemical Industries Limited, a corporation of Great Britain No Drawing. Application October 23, 1935, Serial No. 46,441. In Great Britain October 29, 1934

4 Claims. (Cl. 260—12)

This invention relates to an azo dyestuff and its copper complex, and to a method of preparing them.

It is an object of this invention to prepare a copper-containing direct azo dyestuff. Another object of the invention is to prepare a new azo dyestuff. Other objects of the invention are to prepare the new dyes by methods which are economically and technically satisfactory.

The objects of the invention are accomplished, generally speaking, by combining about two molecular proportions of diazotized 6-chloro-2-aminophenol-4-sulfonic acid with about one molecular proportion of 5,5'-dihydroxy-2,2'-dinaphthylamine-7,7'-disulfonic acid and, if the copper complex is desired, by reacting the product with a copper-yielding compound.

In a preferred form of the invention I manufacture a new copper-containing direct azo dyestuff by combining two molecular proportions of diazotized 6-chloro-2-aminophenol-4-sulfonic acid with one molecular proportion of 5,5'-dihydroxy-2,2'-dinaphthylamine-7,7'-disulfonic acid in aqueous alkaline medium, and treat the resulting dyestuff with copper or an agent yielding copper. Formation of the copper complex takes place readily.

The invention is illustrated but not limited by the following example, in which the parts are by weight.

Example 22.35 parts of 6-chloro-2-aminophenol-4-sulfonic acid are dissolved by warming in 400 parts of water. The solution obtained is made definitely acid to Congo red by adding 25 parts of hydrochloric acid (36%, is cooled to 5° C., by addition of sufficient ice, and is diazotized at this temperature by adding 6.9 parts of sodium nitrite. The diazo solution is then admixed with a solution of 23.05 parts of 5,5'-dihydroxy-2,2'-dinaphthyl-amine-7,7'-disulfonic acid in 400 parts of water containing 50 parts of anhydrous sodium carbonate at 10° C. A bluish solution is formed, and when coupling is complete the dyestuff may be precipitated by neutralizing the solution and adding common salt. To prepare the highly desirable copper complex the dyestuff is filtered off, and redissolved in 1000 parts of water; a solution of 25 parts of copper sulfate crystals in 100 parts of water is added, and the mixture is boiled for about one hour. Sufficient anhydrous sodium carbonate is then added to make the reaction alkaline to litmus paper, the complex precipitates, and is filtered, dried, and ground. It is an almost black powder, which dissolves in water to give a bluish violet solution. When dyed on cotton or other cellulosic bodies it yields bright violet shades of excellent fastness to light.

As many apparently widely different embodiments of this invention may be made without departing from the spirit and scope thereof, it is to be understood that I do not limit myself to the specific embodiments thereof except as defined in the appended claims.

I claim:
1. The compound represented by the formula:

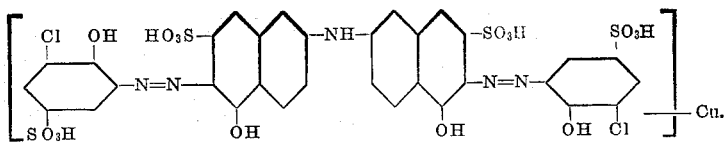

2. The process which comprises diazotizing 22.35 parts of 6-chloro-2-aminophenol-4-sulfonic acid in aqueous solution, coupling it with 23.05 parts of 5,5'-dihydroxy-2,2'-dinaphthylamine-7,7'-disulfonic acid, separating the compound and dissolving it in about 1000 parts of water, adding 25 parts of copper sulfate in 100 parts of water and boiling for about an hour, precipitating, and separating out the copper complex.

3. The process which comprises diazotizing two molecular proportions of diazotized 6-chloro-2-aminophenol-4-sulfonic acid and coupling it with one molecular proportion of 5,5'-dihydroxy-2,2'-dinaphthylamine-7,7'-disulfonic acid in aqueous solution with alkaline medium and boiling the compound with a copper-yielding compound.

4. The process which comprises coupling two molecular proportions of diazotized 6-chloro-2-aminophenol-4-sulfonic acid with one molecular proportion of 5,5'-dihydroxy-2,2'-dinaphthylamine-7,7'- disulfonic acid and reacting the product with a copper-yielding compound.

MORDECAI MENDOZA.